US012621561B2

(12) United States Patent
Goto

(10) Patent No.: US 12,621,561 B2
(45) Date of Patent: May 5, 2026

(54) CONTROL DEVICE AND CONTROL METHOD

(71) Applicant: SONY GROUP CORPORATION, Tokyo (JP)

(72) Inventor: Shuichi Goto, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 35 days.

(21) Appl. No.: 18/571,277

(22) PCT Filed: Feb. 17, 2022

(86) PCT No.: PCT/JP2022/006303
§ 371 (c)(1),
(2) Date: Dec. 18, 2023

(87) PCT Pub. No.: WO2022/269999
PCT Pub. Date: Dec. 29, 2022

(65) Prior Publication Data
US 2024/0284039 A1      Aug. 22, 2024

(30) Foreign Application Priority Data

Jun. 25, 2021    (JP) ................................. 2021-105418

(51) Int. Cl.
| | |
|---|---|
| *H04N 23/60* | (2023.01) |
| *G06T 7/11* | (2017.01) |
| *G06T 7/50* | (2017.01) |
| *H04N 23/611* | (2023.01) |
| *H04N 23/67* | (2023.01) |
| *H04N 23/743* | (2023.01) |

(52) U.S. Cl.
CPC .............. *H04N 23/64* (2023.01); *G06T 7/11* (2017.01); *G06T 7/50* (2017.01); *H04N 23/611* (2023.01);
(Continued)

(58) Field of Classification Search
CPC .... H04N 23/64; H04N 23/611; H04N 23/676; H04N 23/743; H04N 23/61;
(Continued)

(56) References Cited

U.S. PATENT DOCUMENTS

| | | |
|---|---|---|
| 2010/0128163 A1 | 5/2010 | Nagasaka |
| 2014/0176783 A1 | 6/2014 | Shibagami |
(Continued)

FOREIGN PATENT DOCUMENTS

| | | |
|---|---|---|
| JP | 2008-244991 A | 10/2008 |
| JP | 2010128018 A | 6/2010 |
(Continued)

OTHER PUBLICATIONS

International Search Report and Written Opinion of PCT Application No. PCT/JP2022/006303, issued on May 10, 2022, 09 pages of ISRWO.

*Primary Examiner* — Yogesh K Aggarwal
(74) *Attorney, Agent, or Firm* — CHIP LAW GROUP

(57) ABSTRACT

Provided is a control device and a control method and a program that are capable of efficiently performing continuous imaging on main subjects as targets. The control device according to the present technology determines, on the basis of distances to respective main subjects included in an imaging range, the main subjects away from each other by a distance equal to or larger than a threshold distance to be the main subjects different from each other and controls continuous imaging on each of the main subjects, as targets, determined to be the main subjects that are different. The present technology is applicable to a device having an imaging function such as a digital still camera or a smartphone.

10 Claims, 10 Drawing Sheets

(52) U.S. Cl.
CPC ......... *H04N 23/676* (2023.01); *H04N 23/743*
(2023.01); *G06T 2207/20021* (2013.01); *G06T
2207/30196* (2013.01)

(58) Field of Classification Search
CPC .. H04N 23/671; H04N 23/959; H04N 23/675;
G06T 7/11; G06T 7/50; G06T
2207/20021; G06T 2207/30196
See application file for complete search history.

(56) References Cited

U.S. PATENT DOCUMENTS

| | | | |
|---|---|---|---|
| 2015/0350523 A1 | 12/2015 | Kinoshita | |
| 2017/0150130 A1* | 5/2017 | Kimura .................. | H04N 13/20 |
| 2020/0322530 A1* | 10/2020 | Choi ...................... | G06V 10/10 |
| 2021/0097659 A1 | 4/2021 | Hung | |

FOREIGN PATENT DOCUMENTS

| | | | |
|---|---|---|---|
| JP | 2014-127966 A | | 7/2014 |
| JP | 2014123070 A | | 7/2014 |
| JP | 2015070426 A | | 4/2015 |
| JP | 2016040578 A | * | 3/2016 |
| JP | 2016-208530 A | | 12/2016 |
| JP | 2017228082 A | | 12/2017 |
| JP | 2017229061 A | | 12/2017 |
| WO | WO-2014109125 A1 | | 7/2014 |
| WO | 2015/156149 A1 | | 10/2015 |
| WO | WO-2018179695 A1 | | 10/2018 |

* cited by examiner

CONTROL DEVICE AND CONTROL METHOD

CROSS REFERENCE TO RELATED APPLICATIONS

This application is a U.S. National Phase of International Patent Application No. PCT/JP2022/006303 filed on Feb. 17, 2022, which claims priority benefit of Japanese Patent Application No. JP 2021-105418 filed in the Japan Patent Office on Jun. 25, 2021. Each of the above-referenced applications is hereby incorporated herein by reference in its entirety.

TECHNICAL FIELD

The present technology relates to a control device, a control method, and a program, and more particularly to a control device, a control method, and a program that are capable of efficiently performing continuous imaging on main subjects as targets.

BACKGROUND ART

Some devices having an imaging function, such as digital still cameras and smartphones, have a function of focus bracket imaging. The focus bracket imaging is an imaging method in which imaging is continuously performed a plurality of times with the focus position being shifted.

Using the focus bracket imaging function allows a user to capture a plurality of images in which each subject is in focus by a single release operation.

CITATION LIST

Patent Document

Patent Document 1: Japanese Patent Application Laid-Open No. 2013-120949

SUMMARY OF THE INVENTION

Problems to be Solved by the Invention

With the improvement of the autofocus function, it is possible to perform focus bracket imaging while shifting a focus position (focal length) at smaller step sizes, but it is not efficient to capture images by using high resolution at the focus position and focusing on all the lengths.

In addition, if a plurality of images is captured with the focus position being shifted, there is no meaning if the main subject is not in focus.

The present technology has been made in view of such a situation, and is intended to enable efficient continuous imaging on main subjects as targets.

Solutions to Problems

A control device according to one aspect of the present technology includes a main subject determination unit that determines, on the basis of distances to respective main subjects included in an imaging range, the main subjects that are away from each other by a distance equal to or larger than a threshold distance to be the main subjects that are different from each other, and an imaging control unit that controls continuous imaging on each of the main subjects, as targets, determined to be the main subjects that are different.

According to an aspect of the present technology, on the basis of distances to respective main subjects included in an imaging range, the main subjects that are away from each other by a distance equal to or larger than a threshold distance are determined to be the main subjects that are different from each other and continuous imaging on each of the main subjects, as targets, determined to be the main subjects that are different is controlled.

BRIEF DESCRIPTION OF DRAWINGS

FIG. 4 is a block diagram illustrating a hardware configuration example of the imaging device.

FIG. 5 is a block diagram illustrating a functional configuration example of a control unit.

FIG. 10 is a block diagram illustrating a configuration example of hardware of a computer.

MODE FOR CARRYING OUT THE INVENTION

Hereinafter, modes for carrying out the present technology will be described. The description will be given in the following order.

1. Focus bracket imaging
2. Configuration of imaging device
3. Operation of imaging device
4. Others <1. Focus Bracket Imaging>

Figure 1:
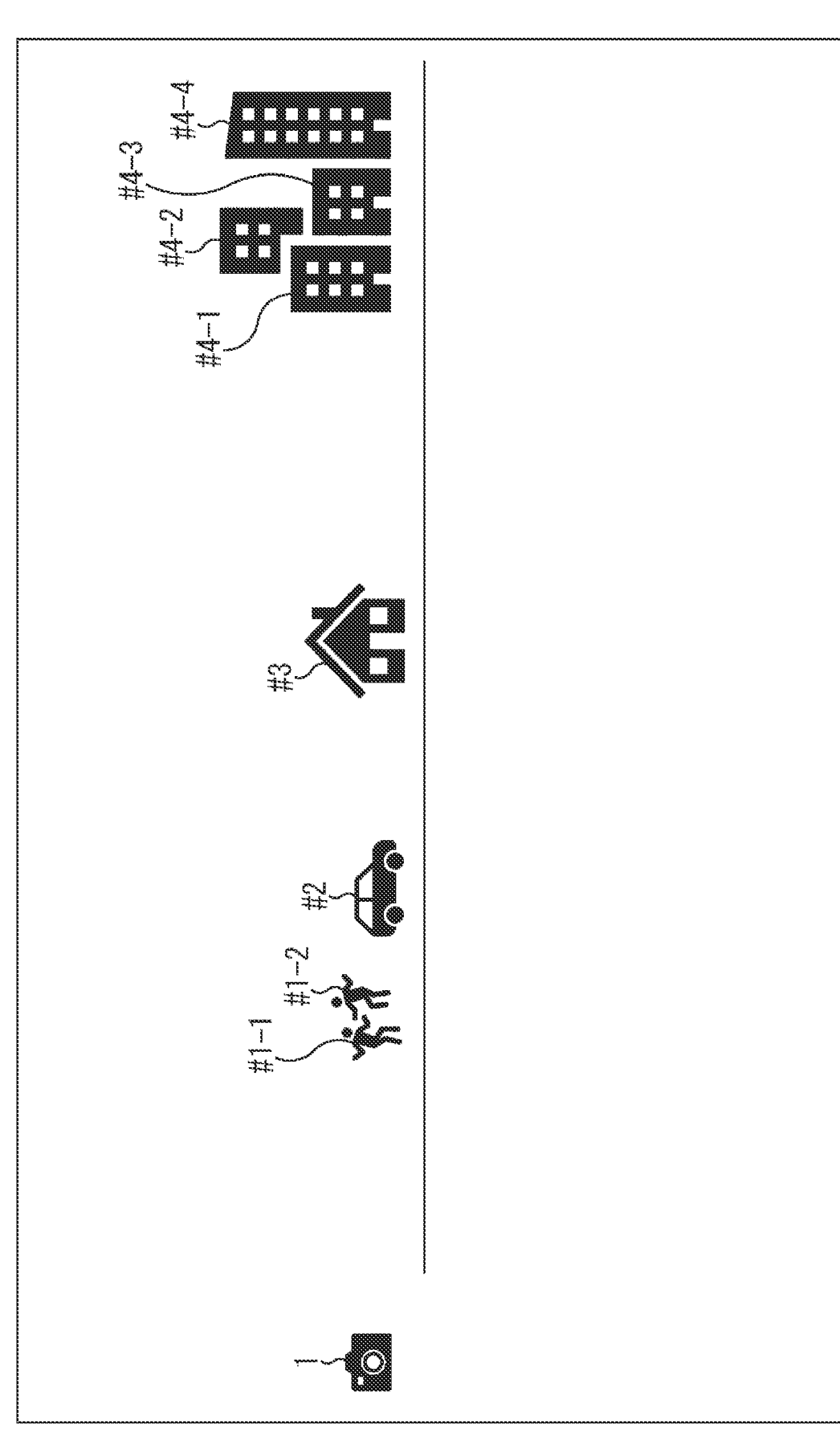
FIG. 1 is a diagram illustrating an example of subjects to be imaged by an imaging device.

FIG. 1 is a diagram illustrating an example of subjects to be imaged by an imaging device 1 according to an embodiment of the present technology.

The imaging device 1 is a device having an imaging function, such as a smartphone, a digital still camera, or a monitoring camera. The imaging device 1 has a function of focus bracket imaging. The focus bracket imaging is an imaging method in which imaging is continuously performed a plurality of times with the focus position being shifted.

Furthermore, the imaging device 1 has a function of detecting main subjects that are main subjects from among the subjects included in an imaging range. For example, the imaging device 1 detects main subjects on the basis of an image captured at the time of preview imaging before execution of focus bracket imaging. A specific type of subject such as a person or a building, a subject appearing large, and the like are detected as the main subjects. Detection of the main subjects will be described later.

In the example of FIG. 1, subjects #1-1, #1-2, #2, #3, and #4-1 to #4-4 are detected as the main subjects among the subjects included in the imaging range of the imaging device 1. Subjects other than the subjects illustrated in FIG. 1 are also included in the imaging range of the imaging device 1.

The subjects #1-1 and #1-2 are persons, and the subject #2 is an automobile. The subject #3 is a house, and the subjects #4-1 to #4-4 are buildings.

The subject #1-1 and the subject #1-2 are each at positions substantially equally distant from the position of the imaging device 1 as a reference. The subject #2 is at a position further distant from the position of the imaging device 1 as the reference than the subjects #1-1 and #1-2 are. The subject #3 is at a position further distant from the position of the imaging device 1 as the reference than the subject #2 is. The subjects #4-1 to #4-4 are each at positions further distant from the position of the imaging device 1 as the reference than the subject #3 is.

Focus bracket imaging is performed on such subjects as main subjects. A plurality of images in a state in which each main subject is in focus is captured by a single focus bracket imaging.

Here, the focus bracket imaging by the imaging device 1 is performed such that the imaging device 1 refers to depth information (distance in the depth direction) and obtains an image in a state in which main subjects at positions close to each other are in focus by a single imaging.

That is, a plurality of main subjects at positions close to each other is not imaged with the respective main subjects being in focus one by one, but is imaged collectively with any one of the main subjects being in focus. Before execution of the focus bracket imaging, main subject determination processing is performed that is a process of determining whether a plurality of main subjects is to be imaged as the main subjects that are different from each other or is to be imaged collectively as the main subjects that are the same.

Figure 2:
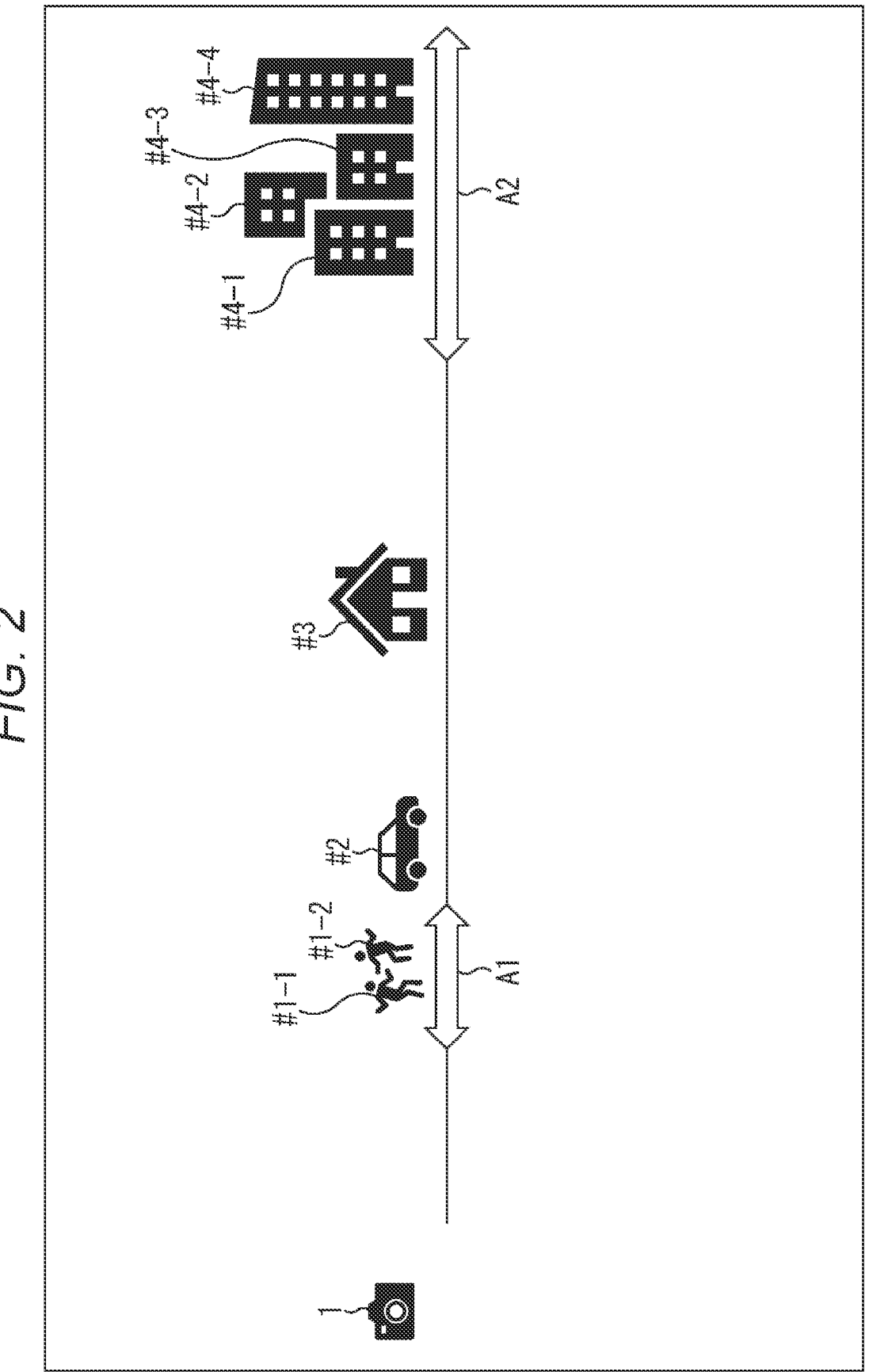
FIG. 2 is a diagram illustrating an example of main subject determination processing.

FIG. 2 is a diagram illustrating an example of the main subject determination processing.

For example, main subjects at positions away from each other by a distance equal to or larger than a threshold distance are determined to be the main subjects that are different from each other. Furthermore, when a certain main subject is in focus, a main subject at a position within a depth of field is determined to be the same as the main subject.

In the example of FIG. 2, the subjects #1-1 and #1-2 are located at positions within the depth of field in a case where, for example, the subject #1-1 is in focus. Bidirectional arrow A1 indicates the range of the depth of field in a case where the subject #1-1 is in focus.

At this time, the imaging device 1 determines the subjects #1-1 and #1-2 to be the same main subject.

Furthermore, the subjects #4-1 to #4-4 are located at positions within the depth of field in a case where, for example, the subject #4-1 is in focus. Bidirectional arrow A2 indicates the range of the depth of field in a case where the subject #4-1 is in focus.

At this time, the imaging device 1 determines the subjects #4-1 to #4-4 to be the same main subject.

Since the subjects #2 and #3 are each at positions away from the other main subjects by a distance equal to or larger than a threshold distance, the subjects #2 and #3 are determined to be different main subjects.

Such determination is made on the basis of a depth map acquired by the imaging device 1. The depth map is map information in which depth information to each position of the respective subjects included in an imaging range is recorded as a pixel value of an individual pixel. The imaging device 1 is installed with a distance sensor such as a time-of-flight (ToF) sensor capable of measuring a distance to each position of the respective subjects.

Figure 3:
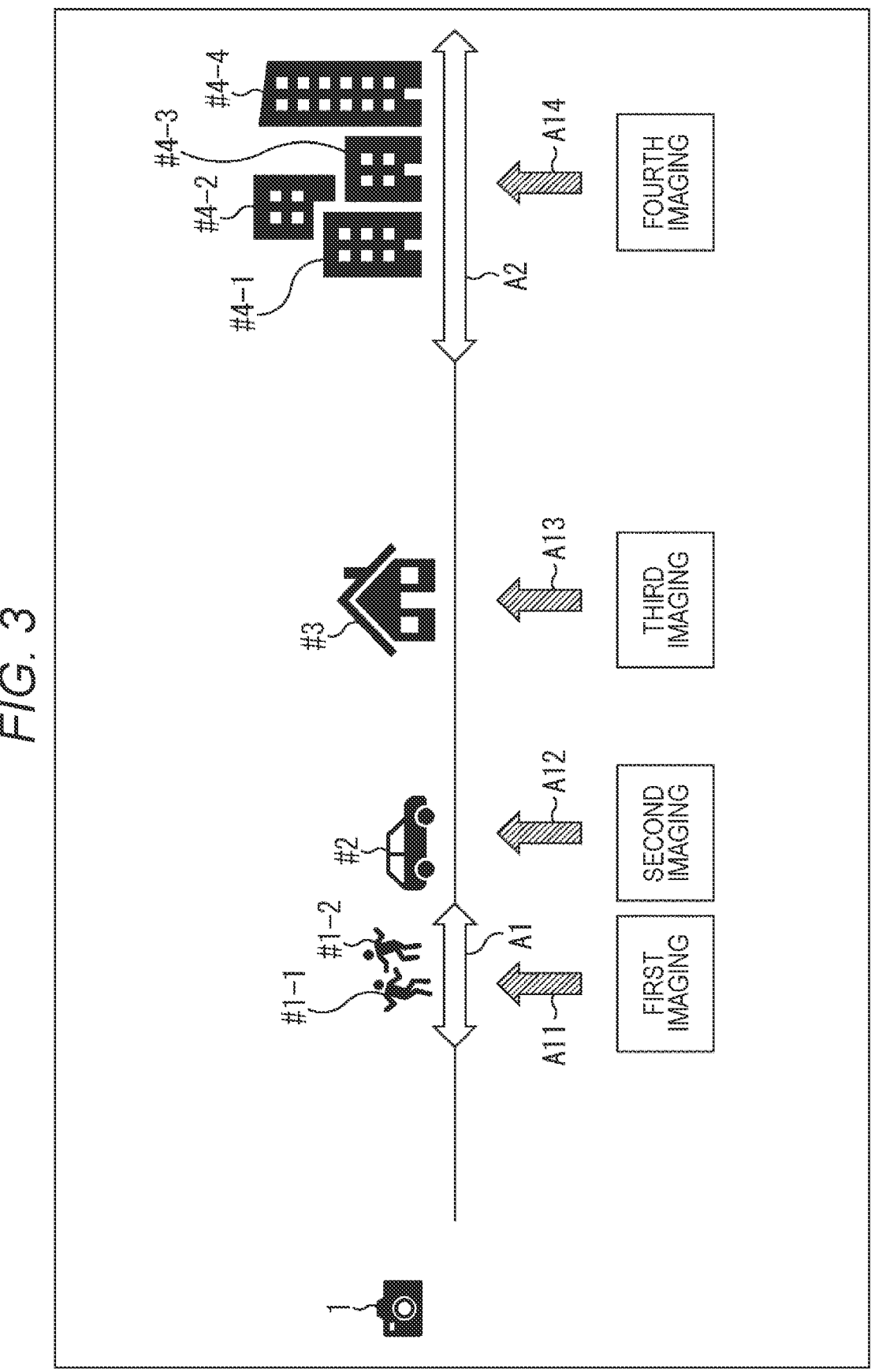
FIG. 3 is a diagram illustrating an example of focus bracket imaging by the imaging device.

FIG. 3 is a diagram illustrating an example of focus bracket imaging by the imaging device 1.

In a case where the main subject determination processing is performed as described with reference to FIG. 2, the focus bracket imaging is performed such that the main subjects are focused and imaged in order from, for example, a main subject in a shorter distance as indicated by upward arrows A11 to A14. In a series of focus bracket imaging, imaging is performed four times.

The first imaging is performed, for example, with the subject #1-1 being in focus. Since the subject #1-2 is at a position within the depth of field with the position of the subject #1-1 as a reference, the image obtained by the first imaging is an image in which not only the subject #1-1 but also the subject #1-2 is in focus.

The second imaging is performed, for example, with the subject #2 being in focus. The image obtained by the second imaging is an image in which the subject #2 is in focus.

The third imaging is performed, for example, with the subject #3 being in focus. The image obtained by the third imaging is an image in which the subject #3 is in focus.

The fourth imaging is performed, for example, with the subject #4-1 being in focus. Since the subjects #4-2 to #4-4 are at positions within the depth of field with the position of the subject #4-1 as a reference, the image obtained by the fourth imaging is an image in which not only the subject #4-1 but also the subjects #4-2 to #4-4 are in focus.

As described above, the focus bracket imaging by the imaging device 1 is performed such that main subjects within a range of a short distance such as a distance within the depth of field are collectively imaged. As a result, the number of times of imaging is reduced and efficient focus bracket imaging is enabled as compared with a case where continuous imaging is performed with all the main subjects of the subjects #1-1, #1-2, #2, #3, and #4-1 to #4-4 being in focus one by one.

A series of operations of the imaging device 1 that performs focus bracket imaging as described above will be described later with reference to a flowchart.

<2. Configuration of Imaging Device>

Figure 4:
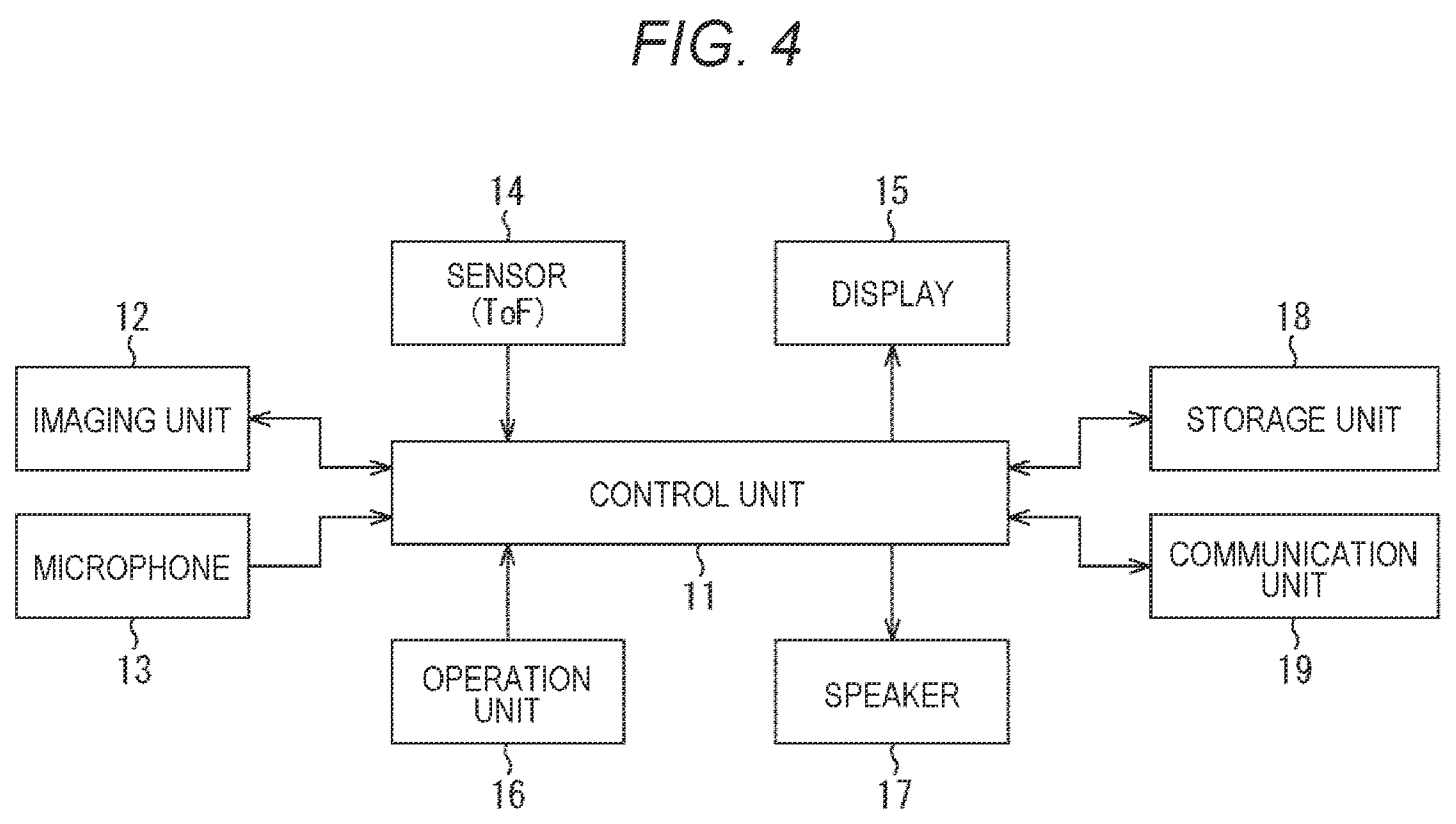

FIG. 4 is a block diagram illustrating a hardware configuration example of the imaging device 1.

The imaging device 1 is configured by connecting an imaging unit 12, a microphone 13, a sensor 14, a display 15, an operation unit 16, a speaker 17, a storage unit 18, and a communication unit 19 to a control unit 11.

The control unit 11 includes a central processing unit (CPU), a read only memory (ROM), a random access memory (RAM), and the like. The control unit 11 executes a predetermined program and controls the entire operation of the imaging device 1 according to the operation of the user. The imaging device 1 including the control unit 11 functions as a control device that controls imaging.

The imaging unit 12 includes a lens, an imaging element, and the like, and performs imaging under the control of the control unit 11. The imaging unit 12 outputs image data obtained by the imaging to the control unit 11.

The microphone 13 outputs audio data such as collected sound to the control unit 11.

The sensor 14 includes a ToF sensor or the like. The sensor 14 measures a distance to each position of the subjects included in the imaging range, and outputs sensor data to the control unit 11.

The display 15 includes an LCD or the like, and displays various types of information such as a menu screen and an image being captured under the control of the control unit 11.

The operation unit 16 includes an operation button, a touch panel, and the like provided on a surface of a housing of the imaging device 1. The operation unit 16 outputs information indicating the content of the user's operation to the control unit 11.

The speaker 17 outputs sound on the basis of an audio signal supplied from the control unit 11.

The storage unit 18 includes a flash memory, or a memory card inserted in a card slot provided in the housing. The storage unit 18 stores various types of data such as image data supplied from the control unit 11.

The communication unit 19 performs wireless or wired communication with an external device. The communication unit 19 transmits various types of data such as image data supplied from the control unit 11 to a computer, a smartphone, and the like.

Figure 5:
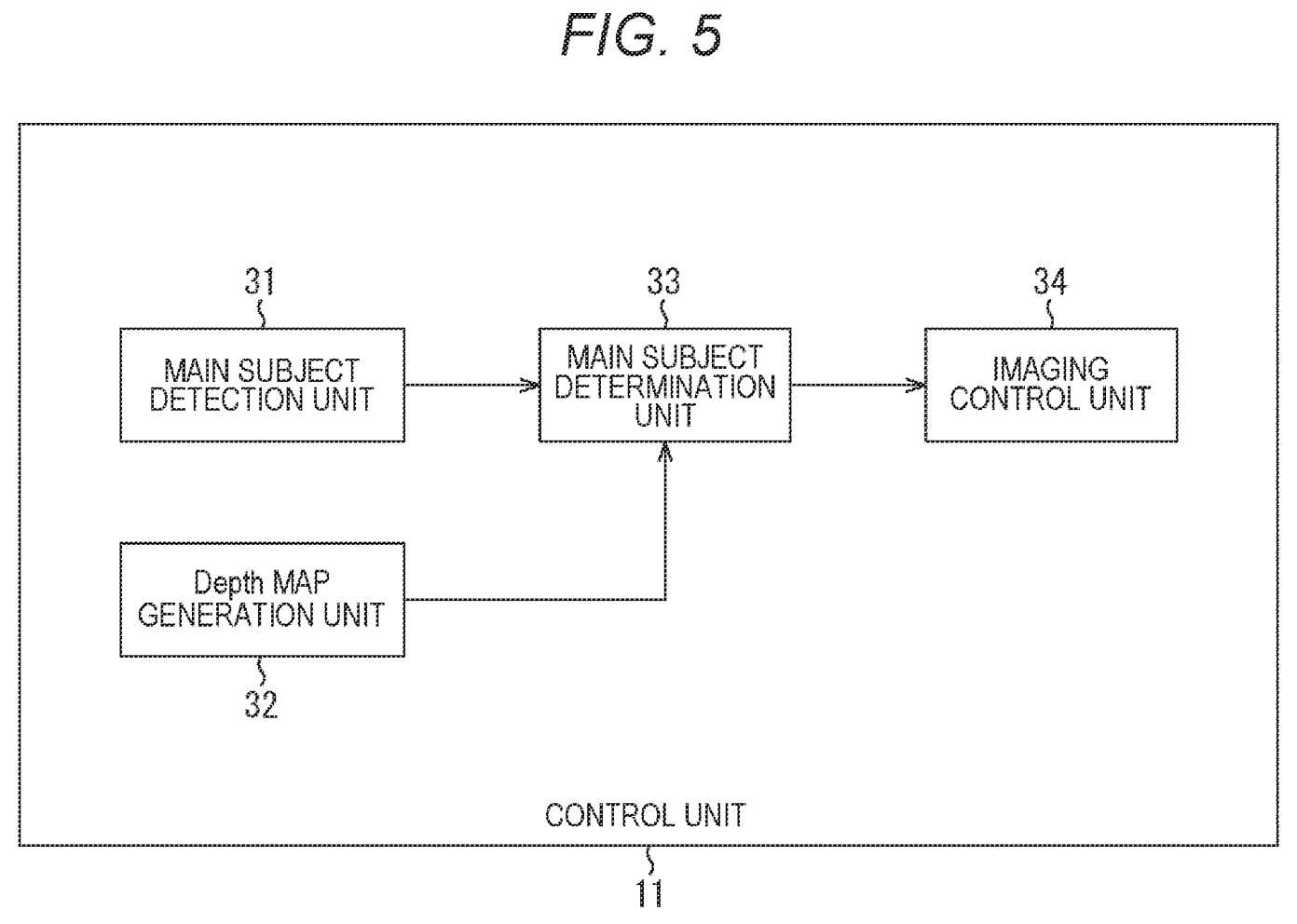

FIG. 5 is a block diagram illustrating a functional configuration example of the control unit 11.

As illustrated in FIG. 5, the control unit 11 includes a main subject detection unit 31, a depth map generation unit 32, a main subject determination unit 33, and an imaging control unit 34. The image data supplied from the imaging unit 12 is input to the main subject detection unit 31, and the sensor data supplied from the sensor 14 is input to the depth map generation unit 32.

The main subject detection unit 31 detects a certain subject as a main subject from among the subjects included in the imaging range.

Here, a method of detecting main subjects, and a main subject degree map will be described with reference to FIGS. 6 and 7.

Figure 6:
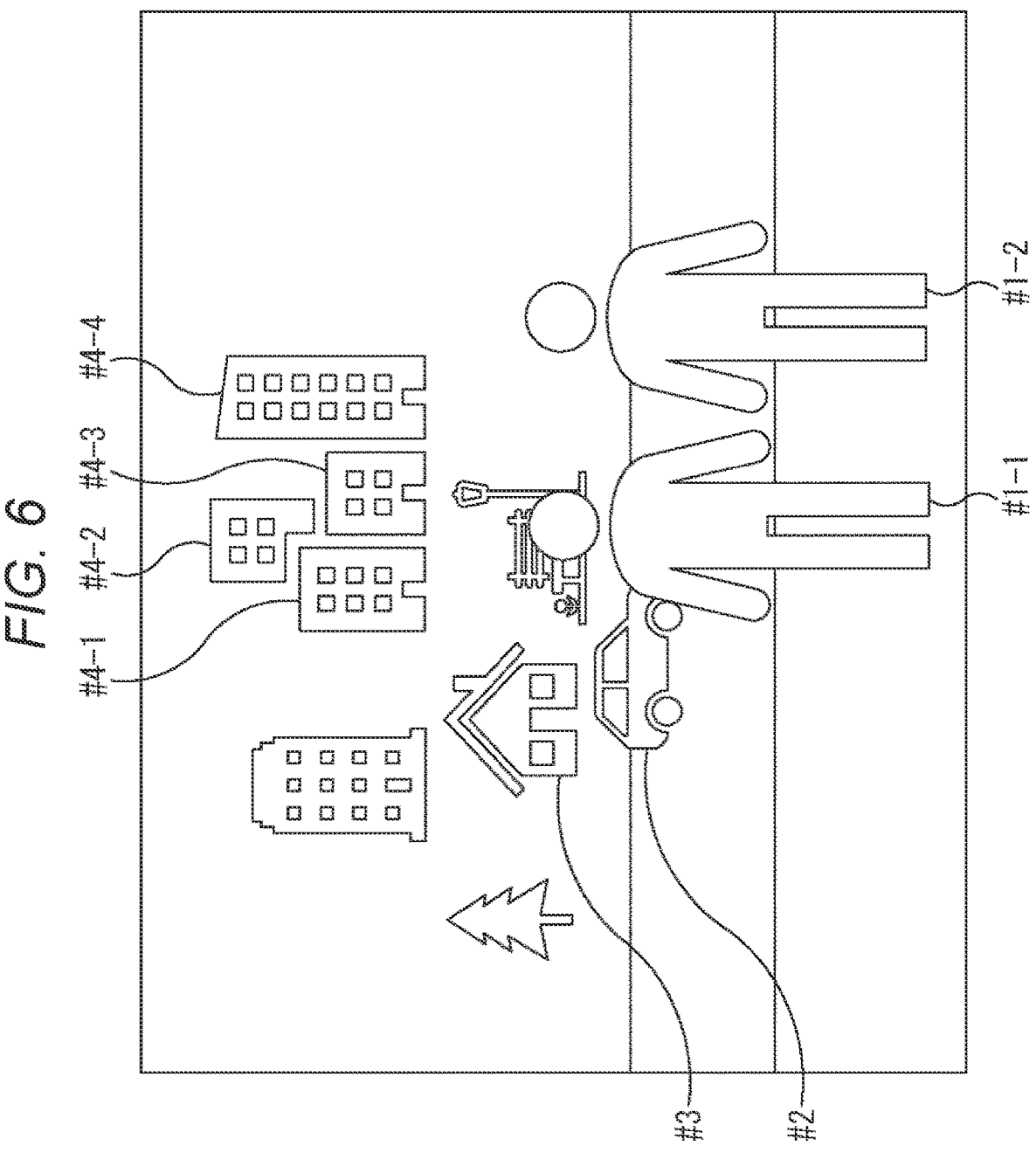
FIG. 6 is a diagram illustrating an example of an imaging scene.

FIG. 6 is a diagram illustrating an example of an imaging scene captured by the imaging device 1.

In the example of FIG. 6, the subjects #1-1, #1-2, #2, #3, and #4-1 to #4-4 are included in the imaging range of the imaging device 1. In addition, subjects not illustrated in FIG. 1 or the like are also included in the imaging range.

Figure 7:
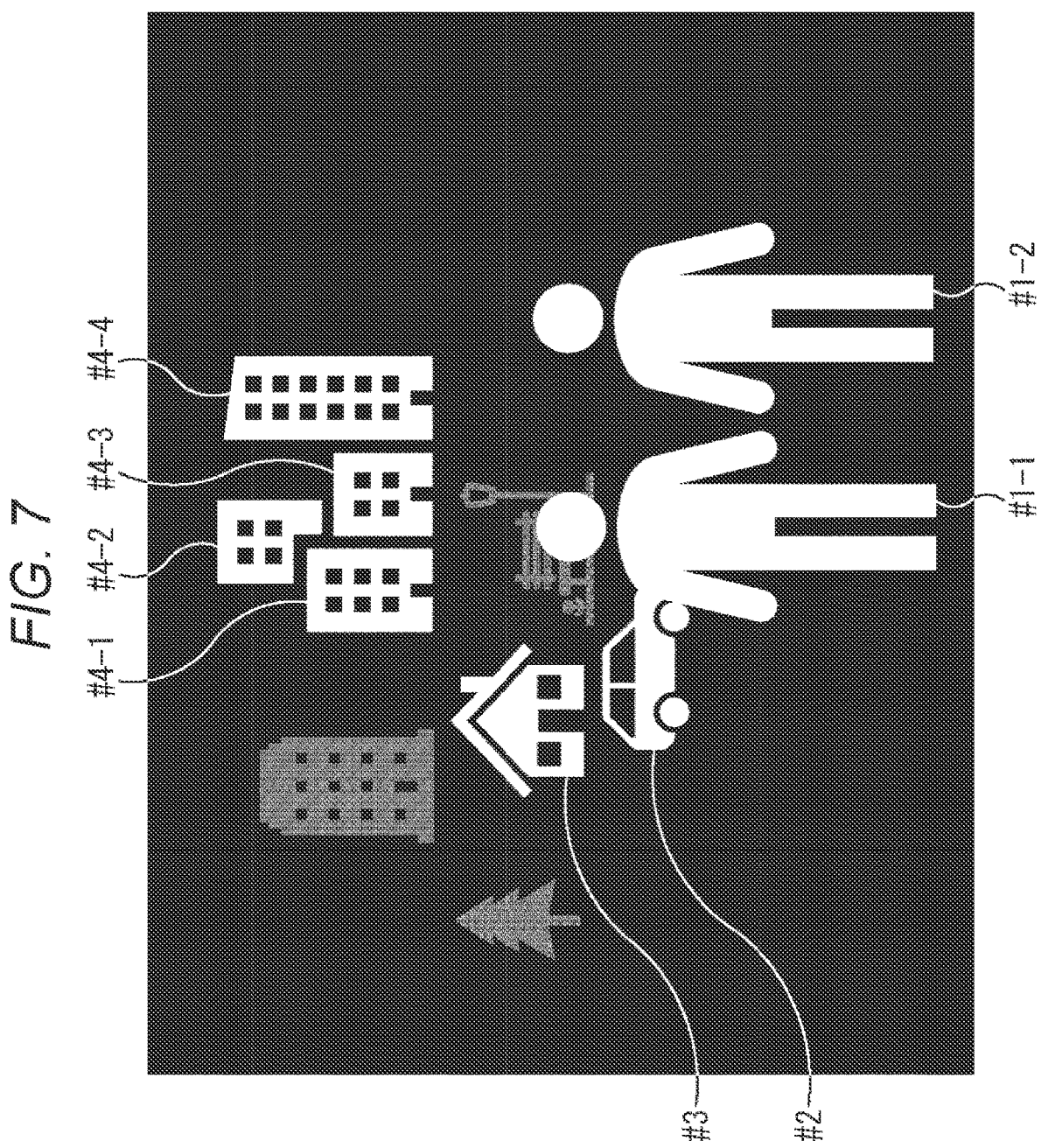
FIG. 7 is a diagram illustrating an example of a main subject degree map.

The main subject detection unit 31 generates a main subject degree map as illustrated in FIG. 7 as a detection result of the main subjects on the basis of an image obtained by imaging such a scene. The main subject degree map is map information in which a main subject degree that is a value indicating "the likeliness of the main subject" for a subject in the imaging range is included as a pixel value of an individual pixel. For example, a pixel of a bright color is a pixel in which a captured content has a high main subject degree.

In the example of FIG. 7, pixels in which the subjects #1-1, #1-2, #2, #3, and #4-1 to #4-4 are captured are detected as pixels having a high main subject degree. Pixels in which another subject is captured are detected as pixels having a low main subject degree.

Such a main subject degree map is generated using, for example, an inference model acquired by machine learning. For example, machine learning using a plurality of pieces of images labeled with information indicating which subject is the main subject as training data is performed, whereby an inference model for the main subject degree map is generated.

The main subject detection unit 31 inputs an image obtained by imaging to the inference model for the main subject degree map, and acquires a main subject degree map on the basis of the output of the inference model. The main subject detection unit 31 detects a certain subject as a main subject on the basis of the main subject degree map.

The main subject degree map may be generated by analyzing the image captured by the imaging unit 12. For example, an image captured by the imaging unit 12 is analyzed, and a specific type of subject, a subject appearing large, and the like are detected as the main subjects.

The information on the main subjects detected by the main subject detection unit 31 as described above is output to the main subject determination unit 33.

The depth map generation unit 32 generates a depth map on the basis of sensor data indicating a distance to each position of the respective subjects included in the imaging range.

The depth map may be generated using the output of the ToF sensor or may be generated using artificial intelligence (AI). In a case where the depth map is generated using AI, for example, an inference model is prepared in the depth map generation unit 32, the inference model having an image captured by the imaging unit 12 as an input and the distance to each position of the respective subjects included in the imaging range as an output. The depth map generation unit 32 inputs the image captured by the imaging unit 12 to the inference model generated by machine learning, and acquires the distance to each position of the respective subjects.

In a case where the imaging unit 12 includes a stereo camera, the distance to each position of the respective subjects may be acquired on the basis of an image captured by the stereo camera. Information on the depth map generated by the depth map generation unit 32 is output to the main subject determination unit 33.

The main subject determination unit 33 performs the main subject determination processing described above on the basis of the supplied information on the main subject and information on the depth map. Information indicating the determination result is output to the imaging control unit 34. Note that whether the main subjects are to be imaged as different main subjects or are to be imaged as the same main subject may be determined by another method. Determination of the main subject is disclosed in, for example, Japanese Patent Application Laid-Open No. 2013-120949.

The imaging control unit 34 controls the imaging unit 12 to perform focus bracket imaging. That is, the imaging control unit 34 performs continuous imaging, on the basis of the information supplied from the main subject determination unit 33, by focusing on each of the main subjects determined to be different main subjects.

<3. Operation of Imaging Device>

Figure 8:
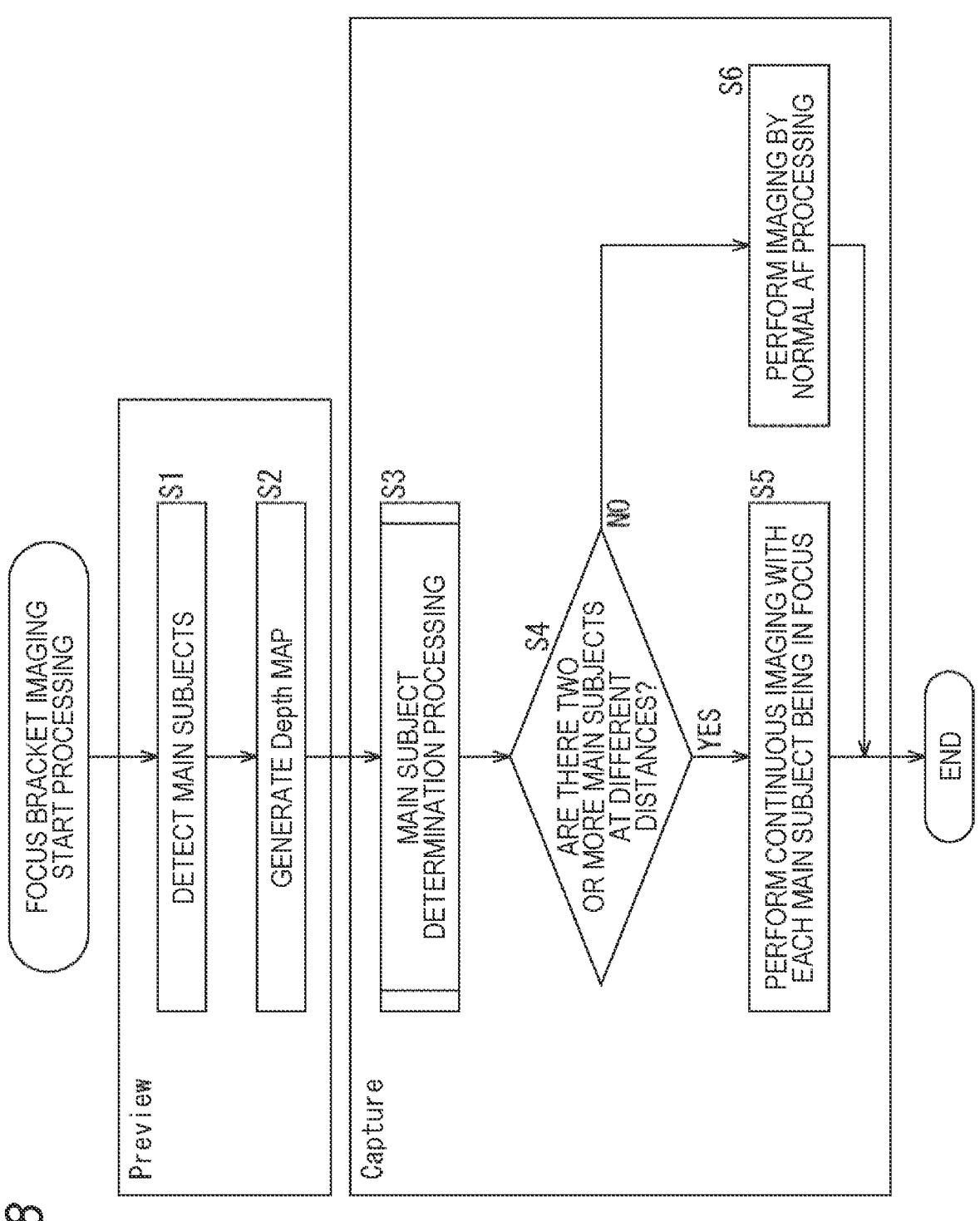
FIG. 8 is a flowchart illustrating imaging processing of the imaging device.

With reference to a flowchart of FIG. 8, imaging processing of the imaging device 1 will be described.

In step S1, the main subject detection unit 31 detects main subjects on the basis of a captured image.

In step S2, the depth map generation unit 32 generates a depth map on the basis of sensor data indicating a measurement result by the ToF sensor.

The processing in steps S1 and S2 is processing at the time of preview imaging, and the processing in and after step S3 is processing at the time of execution of focus bracket imaging.

In step S3, the main subject determination unit 33 performs the main subject determination processing on the basis of information on the main subjects and information on the depth map. The main subject determination processing will be described later with reference to a flowchart of FIG. 9.

In step S4, the imaging control unit 34 determines whether or not there are two or more main subjects at different distances on the basis of the determination result by the main subject determination unit 33.

In a case where it is determined in step S4 that there are two or more main subjects at different distances, in step S5, the imaging control unit 34 performs continuous imaging by focusing on each of the main subjects at distant positions. The main subjects within a range of a short distance such as a distance within the depth of field are imaged collectively.

In a case where it is determined in step S4 that there are not two or more main subjects at different distances, in step S6, the imaging control unit 34 controls imaging by normal autofocus processing. Imaging is performed once with one main subject being in focus.

With the above processing, the imaging device 1 can efficiently perform focus bracket imaging on the main subjects as targets.

Figure 9:
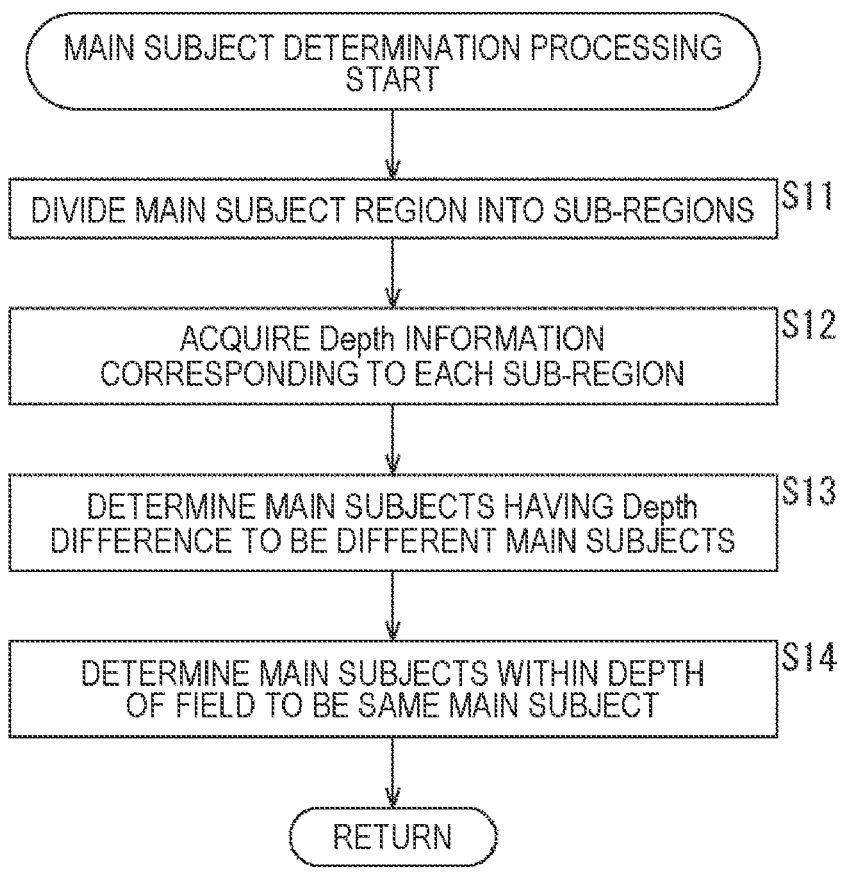
FIG. 9 is a flowchart illustrating main subject determination processing performed in step S3 of FIG. 8.

The main subject determination processing performed in step S3 of FIG. 8 will be described with reference to the flowchart of FIG. 9.

In step S11, the main subject determination unit 33 divides a main subject region that is a region of the main subjects into sub-regions having a certain size on the main subject degree map. For example, a region including pixels having the main subject degree equal to or greater than a predetermined threshold is determined to be a main subject region, and such a main subject region is divided into sub-regions.

In step S12, the main subject determination unit 33 acquires depth information corresponding to each sub-region on the basis of the depth map.

In step S13, the main subject determination unit 33 determines main subjects having a depth difference to be the main subjects that are different from each other. Main subjects at positions away from each other by a distance equal to or larger than the predetermined threshold distance are determined to be the main subjects that are different from each other.

In step S14, when a certain main subject is in focus, the main subject determination unit 33 determines a main subject at a position within the depth of field to be the same main subject.

By the above processing, for example, the subject #1-1 and the subject #2 in FIG. 1 are determined to be the main subjects that are different from each other. Furthermore, the subject #1-1 and the subject #1-2 are determined to be the same main subject. Thereafter, the process returns to step S3 in FIG. 8 and processing in step S3 and subsequent steps is performed.

With the above series of processing, the imaging device 1 can efficiently perform focus bracket imaging on main subjects as targets.

<4. Others>

Although the case of performing focus bracket imaging on the basis of the result of the main subject determination processing has been described, the above-described technology is also applicable to exposure bracket imaging in which continuous imaging is performed with exposure being adjusted. That is, in a case where continuous imaging is performed with the exposure being adjusted according to the brightness of each of the main subjects, the main subjects within a range of a close distance such as a distance within the depth of field are collectively imaged using the same adjustment value of the exposure.

The focus bracket imaging as described above by a device having a camera function may be performed under the control of an external device. In this case, the external device that controls focus bracket imaging functions as the control device. The external control device includes the same configuration as the configuration of the control unit 11 described with reference to FIG. 5.

About Program

The series of processing described above can be executed by hardware or software. In a case where the series of processing is executed by software, a program constituting the software is installed from a program recording medium to a computer incorporated in dedicated hardware, a general-purpose personal computer, or the like.

Figure 10:
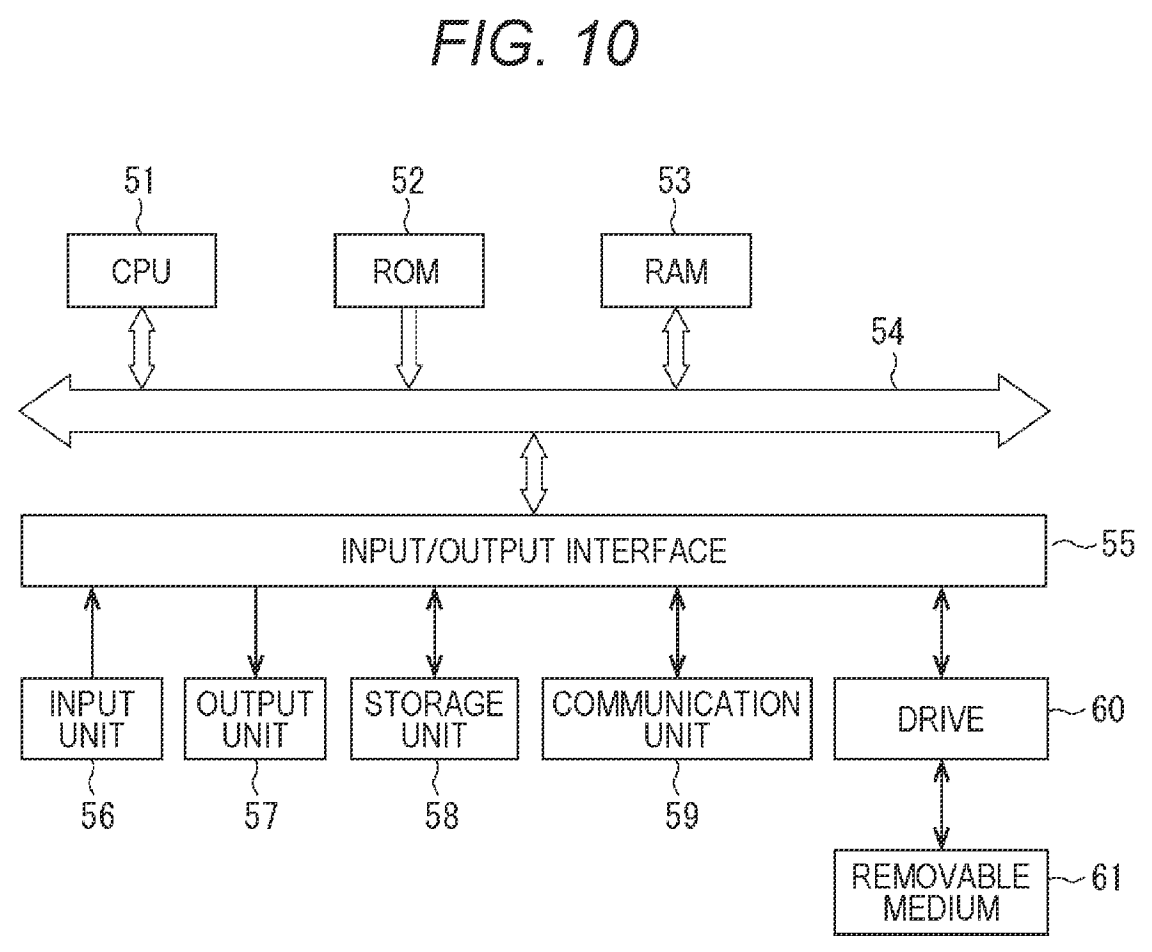

FIG. 10 is a block diagram illustrating a configuration example of the hardware of the computer that executes the above-described series of processing by a program.

A central processing unit (CPU) 51, a read only memory (ROM) 52, and a random access memory (RAM) 53 are mutually connected by a bus 54.

An input/output interface 55 is further connected to the bus 54. An input unit 56, an output unit 57, a storage unit 58, a communication unit 59, and a drive 60 are connected to the input/output interface 55. The drive 60 drives a removable medium 61 such as a magnetic disk, an optical disk, a magneto-optical disk, or a semiconductor memory.

In the computer configured as described above, for example, the CPU 51 loads a program stored in the storage unit 58 into the RAM 53 via the input/output interface 55 and the bus 54 and executes the program, and thus the above-described series of processing is performed.

The program to be executed by the CPU 51 is provided, for example, by being recorded on the removable medium 61 or via a wired or wireless transmission medium such as a local area network, the Internet, or digital broadcasting, and is installed in the storage unit 58.

Note that the program executed by the computer may be a program in which processing is performed in time series in the order described in the present specification, or may be a program in which processing is performed in parallel or at necessary timing such as when a call is made.

Note that the effects described in the present specification are merely examples and are not restrictive, and there may be other effects.

Embodiments of the present technology are not limited to the above-described embodiments, and various modifications may be made without departing from the gist of the present technology.

For example, the present technology may be configured as cloud computing in which one function is shared by a plurality of devices via the network to process together.

Furthermore, each step described in the above-described flowcharts may be performed by one device or by a plurality of devices in a shared manner.

Moreover, in a case where one step includes a plurality of kinds of processing, the plurality of kinds of processing included in the one step may be executed by one device, or may be executed by a plurality of devices in a shared manner.

Examples of Combinations of Configurations

The present technology may also have the following configurations.

(1)

A control device including a main subject determination unit that determines, on the basis of distances to respective main subjects included in an imaging range, the main subjects that are away from each other by a distance equal to or larger than a threshold distance to be the main subjects that are different from each other, and

9 an imaging control unit that controls continuous imaging on each of the main subjects, as targets, determined to be the main subjects that are different.

(2)

The control device according to (1), in which when a certain of the main subjects is in focus, the main subject determination unit determines another of the main subjects within a depth of field to be the same as the main subject, and the imaging control unit performs imaging once on a plurality of the main subjects, as targets, determined to be the same.

(3)

The control device according to (1) or (2), further including a depth map generation unit that generates a depth map indicating a distance to each of the main subjects included in the imaging range.

(4)

The control device according to (3), in which the depth map generation unit generates the depth map on the basis of information obtained from a ToF sensor.

(5)

The control device according to (3) or (4), further including a main subject detection unit that generates a main subject degree map in which a main subject degree indicating a degree of likeliness of the main subjects is included as a pixel value of an individual pixel.

(6)

The control device according to (5), in which the main subject determination unit divides a region of the main subjects on the main subject degree map into sub-regions having a certain size, and determines the main subjects on the basis of a distance to each of the sub-regions acquired from the depth map.

(7)

The control device according to (5) or (6), in which the main subject detection unit generates the main subject degree map using an inference model having an image as an input and the main subject degree map as an output.

(8)

The control device according to any one of (1) to (7), in which the imaging control unit controls focus bracket imaging in which continuous imaging is performed with each of the main subjects being in focus.

(9)

The control device according to any one of (1) to (7), in which the imaging control unit controls exposure bracket imaging in which continuous imaging is performed with exposure of each of the main subjects being adjusted.

(10)

A control method including determining, by a control device, on the basis of distances to respective main subjects included in an imaging range, the main subjects that are away from each other by a distance equal to or larger than a threshold distance to be the main subjects that are different from each other, and controlling, by the control device, continuous imaging on each of the main subjects, as targets, determined to be the main subjects that are different.

10

(11)

A program causing a computer to perform processing of determining, on the basis of distances to respective main subjects included in an imaging range, the main subjects that are away from each other by a distance equal to or larger than a threshold distance to be the main subjects that are different from each other, and controlling continuous imaging on each of the main subjects, as targets, determined to be the main subjects that are different.

REFERENCE SIGNS LIST

1 Imaging device
11 Control unit
31 Main subject detection unit
32 Depth map generation unit
33 Main subject determination unit
34 Imaging control unit

The invention claimed is:

1. A control device, comprising:

a main subject determination unit configured to:

divide a main subjects region on a main subject degree map into a plurality of sub-regions having a specific size, wherein the main subject degree map indicates a degree of likeliness of a plurality of main subjects included as a pixel value of an individual pixel; and determine, based on a distance to each sub-region of the plurality of sub-regions, two main subjects that are different, wherein the plurality of main subjects comprises the two main subjects, and the determination that the two main subjects are different is based on a distance between the two main subjects being equal to or larger than a threshold distance; and an imaging control unit configured to control a continuous imaging operation on each main subject of the two main subjects as a target.

2. The control device according to claim 1, wherein the two main subjects includes a first main subject, the main subject determination unit is further configured to determine, at a time the first main subject is in focus, a second main subject of the plurality of main subjects within a depth of field same as that of the first main subject, and the imaging control unit is further configured to perform imaging once on the first main subject and the second main subject.

3. The control device according to claim 1, further comprising a depth map generation unit configured to generate a depth map indicating a distance to each of the plurality of main subjects included in an imaging range.

4. The control device according to claim 3, wherein the depth map generation unit is further configured to generate the depth map based on a basis of information obtained from a time-of-flight (ToF) sensor.

5. The control device according to claim 3, further comprising a main subject detection unit configured to generate the main subject degree map.

6. The control device according to claim 5, wherein the main subject detection unit is further configured to generate the main subject degree map based on an inference model having an image as an input and the main subject degree map as an output.

7. The control device according to claim 1, wherein the imaging control unit is further configured to control focus bracket imaging operation for the continuous imaging operation.

8. The control device according to claim 1, wherein the imaging control unit is further configured to control exposure bracket imaging operation in which the continuous imaging operation is based on exposure associated with each of the two main subjects.

9. A control method, comprising:

dividing a main subjects region on a main subject degree map into a plurality of sub-regions having a specific size, wherein the main subject degree map indicates a degree of likeliness of a plurality of main subjects included as a pixel value of an individual pixel; and determining, based on a distance to each sub-region of the plurality of sub-regions, two main subjects that are different, wherein the plurality of main subjects comprises the two main subjects, and the determination that the two main subjects are different is based on a distance between the two main subjects being equal to or larger than a threshold distance; and controlling continuous imaging operation on each main subject of the two main subjects as a target.

10. A non-transitory computer-readable medium having stored thereon, computer-executable instructions which, when executed by a computer, cause the computer to execute operations, the operations comprising:

dividing a main subjects region on a main subject degree map into a plurality of sub-regions having a specific size, wherein the main subject degree map indicates a degree of likeliness of a plurality of main subjects included as a pixel value of an individual pixel; and determining, based on a distance to each sub-region of the plurality of sub-regions, two main subjects that are different, wherein the plurality of main subjects comprises the two main subjects, and the determination that the two main subjects are different is based on a distance between the two main subjects being equal to or larger than a threshold distance; and controlling continuous imaging operation on each main subject of the two main subjects as a target.

\* \* \* \* \*